(12) United States Patent
Rizzato et al.

(10) Patent No.: US 9,359,031 B2
(45) Date of Patent: Jun. 7, 2016

(54) BICYCLE SADDLE

(71) Applicant: G.R. BIKE S.R.L., Padua, Frazione Camin (IT)

(72) Inventors: Andrea Rizzato, Abano Terme (IT); Gildo Rizzato, Abano Terme (IT)

(73) Assignee: G.R. BIKE S.R.L., Padua, Frazione Camin (IT)

( * ) Notice: Subject to any disclaimer, the term of this patent is extended or adjusted under 35 U.S.C. 154(b) by 0 days.

(21) Appl. No.: 14/380,062

(22) PCT Filed: Feb. 19, 2013

(86) PCT No.: PCT/EP2013/053256
§ 371 (c)(1),
(2) Date: Aug. 20, 2014

(87) PCT Pub. No.: WO2013/124263
PCT Pub. Date: Aug. 29, 2013

(65) Prior Publication Data
US 2015/0102643 A1   Apr. 16, 2015

(30) Foreign Application Priority Data
Feb. 22, 2012   (IT) .............................. PD2012A0044

(51) Int. Cl.
*B62J 1/18*   (2006.01)
*B62J 1/00*   (2006.01)

(52) U.S. Cl.
CPC ..... *B62J 1/18* (2013.01); *B62J 1/00* (2013.01)

(58) Field of Classification Search
CPC ..................................... B62J 1/18; B62J 1/00

USPC ............ 297/214, 195.1, 202, 452.23, 219.11, 297/215.16
See application file for complete search history.

(56) References Cited

U.S. PATENT DOCUMENTS

| | | | | |
|---|---|---|---|---|
| D25,030 S | * | 12/1895 | Young | D6/354 |
| D26,069 S | * | 9/1896 | Munro | D6/354 |
| 3,712,670 A | * | 1/1973 | Svehla et al. | 297/214 |
| 2007/0273184 A1 | * | 11/2007 | Garneau | 297/195.1 |
| 2013/0099531 A1 | * | 4/2013 | Segato et al. | 297/214 |

FOREIGN PATENT DOCUMENTS

| | | | |
|---|---|---|---|
| FR | 356291 A | * | 11/1905 |
| FR | 888828 A | | 12/1943 |
| FR | 1004031 A | | 3/1952 |
| FR | 2486014 A1 | | 1/1982 |
| WO | WO9211175 A1 | * | 7/1992 |

OTHER PUBLICATIONS

International Search Report (PCT/ISA/210) for PCT/EP2013/053256 mailed Apr. 24, 2013 and Written Opinion of the International Searching Authority (PCT/ISA/237).
Italian Search report for IT PD20120044 dated May 16, 2012.

* cited by examiner

*Primary Examiner* — Milton Nelson, Jr.
(74) *Attorney, Agent, or Firm* — Koppel, Patrick, Heybl & Philpott

(57) ABSTRACT

A bicycle saddle of the type comprising a shell, a padding and an overlying covering for the padding wherein the shell has at least one part thereof which is formed with a concavity directed upward in the configuration for use, so as to accommodate a corresponding portion of padding.

4 Claims, 2 Drawing Sheets

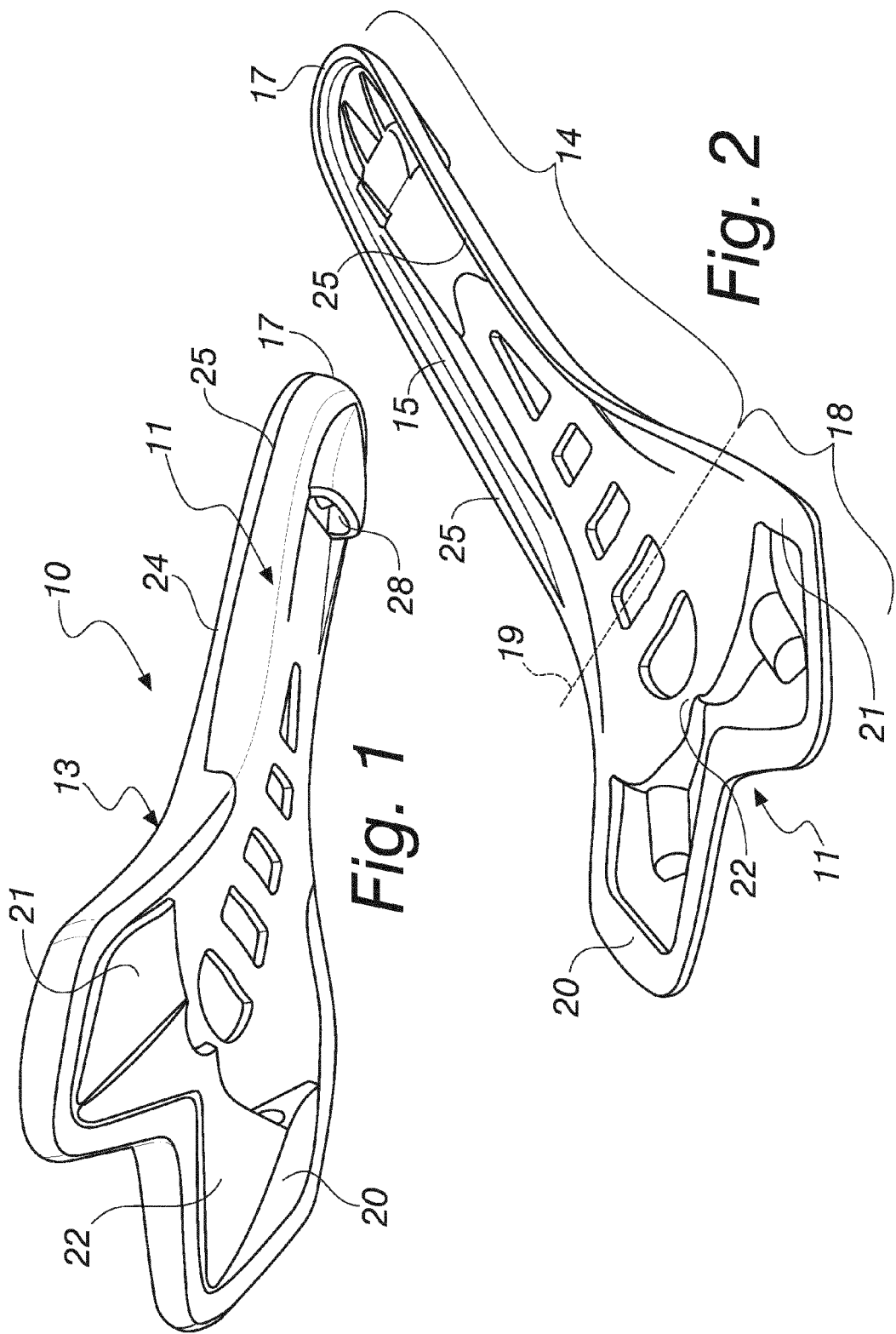

BICYCLE SADDLE

The present invention relates to a bicycle saddle.

Typically, in a cycling saddle for racing bicycles, mountain bikes, city bikes and the like, four parts are distinguished: the frame, the shell, the padding and the covering, the frame and the shell having a structural function.

In known saddles, the shell has a substantially concave shape, with the concavity directed downward along its entire length, so that the frame, generally a metallic bar that is bent so as to form three points for fixing to the shell, a front point and two rear points, is arranged mostly inside the concavity, substantially hidden from view.

Saddles with such a shell, despite being widespread and appreciated, have the drawback that their upper convex surface is covered with a padding of limited thickness, which makes said saddles scarcely comfortable.

Furthermore, such a shape of the shell requires a covering that covers said shell completely on the outside until it is stitched or glued or fixed otherwise to the edges of the shell, which are directed downward.

In this manner, the shell, completely covered on the outside, is not involved, except with its shape, in defining the aesthetic impact of the saddle, the surface appearance of which is entrusted to the covering, except for particular solutions in which a central portion of the padding is missing and the shell is variously perforated in the same region.

The aim of the present invention is to provide a bicycle saddle that is capable of obviating the cited drawbacks of known saddles.

Within this aim, an object of the invention is to provide a saddle that is more comfortable than similar saddles of the known type.

Another object of the invention is to provide a saddle that is capable of an aesthetic impact that is new and distinctive with respect to known saddles.

A further object of the invention is to provide a saddle that can be installed on existing bicycles in the same way as known saddles.

Another object of the invention is to propose a bicycle saddle that can be manufactured with known systems and technologies.

This aim, as well as these and other objects that will become more apparent hereinafter, are achieved by a bicycle saddle, of the type comprising a shell, a padding and an overlying covering for said padding, characterized in that said shell has at least one part thereof which is shaped with a concavity directed upward in the configuration for use, so as to accommodate a corresponding portion of padding.

Further characteristics and advantages of the invention will become more apparent from the description of a preferred but not exclusive embodiment of the bicycle saddle according to the invention, illustrated by way of non-limiting example in the accompanying drawings, wherein:

FIG. 1 is a perspective view of a saddle according to the invention;

FIG. 2 is a perspective view of the shell of a saddle according to the invention;

Figure 3:
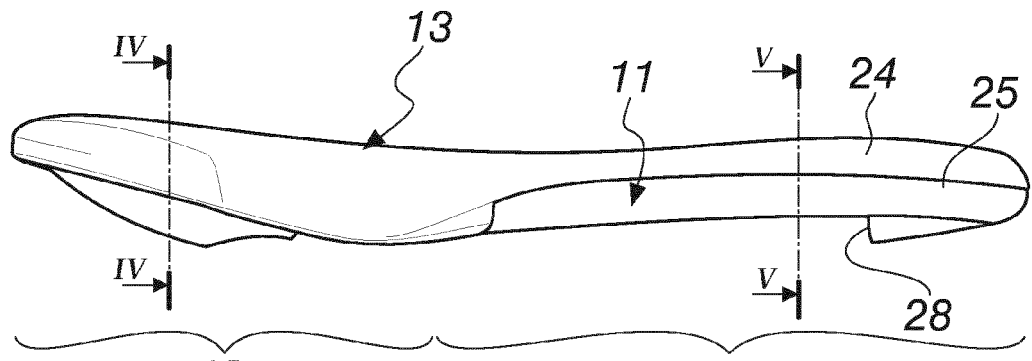
FIG. 3 is a side view of a saddle according to the invention.

With reference to the cited figures, a bicycle saddle according to the invention is generally designated by the reference numeral 10.

Figure 4:
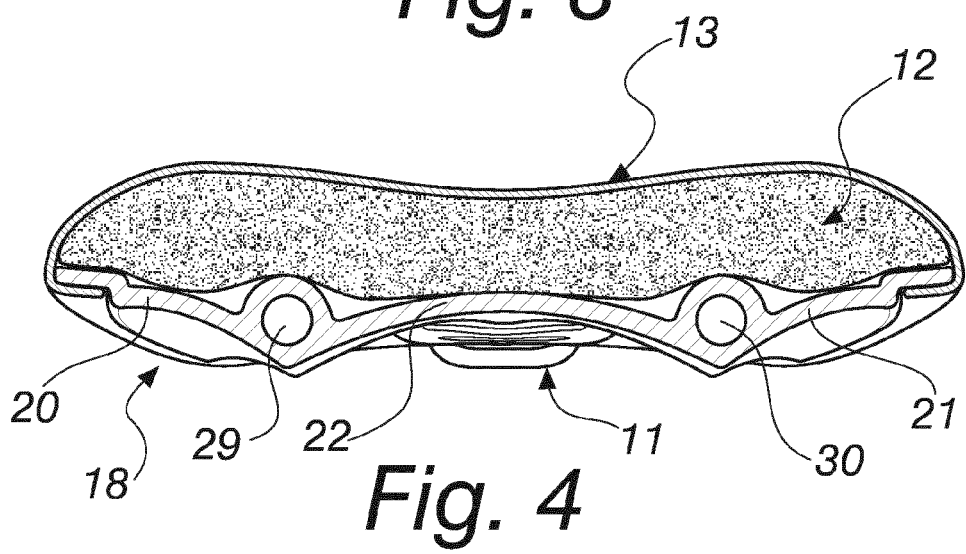
FIG. 4 is a sectional view, taken along the sectional plane IV-IV of FIG. 3.
Figure 5:
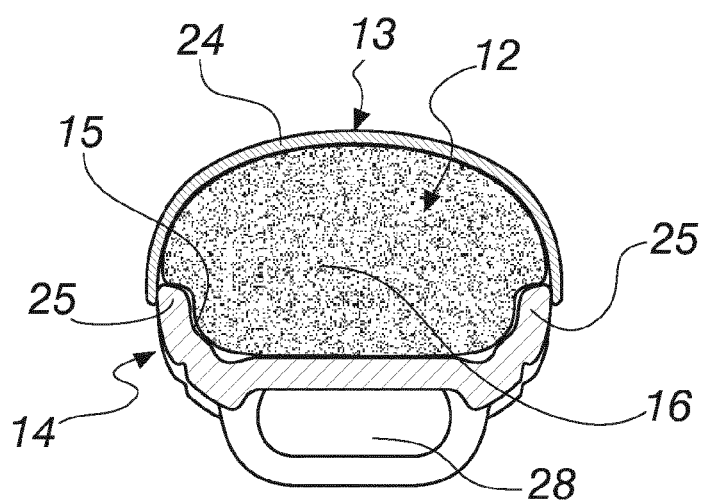
FIG. 5 is a sectional view, taken along the sectional plane V-V of FIG. 3.

The saddle 10 comprises a shell 11, a padding 12 and an overlying covering 13 for the padding, the latter being visible in the sectional views of FIGS. 4 and 5.

The shell 11 has a part 14 that is shaped with the concavity 15 directed upward in the configuration for use, so as to accommodate a corresponding portion 16 of the padding 12.

The part 14 with the concavity directed upward extends, in the constructive example described here, from the end 17 of the front tip of the saddle substantially to the front end of the rear wider portion 18 for supporting the buttocks of a user, said front end being indicated by the dashed line 19 in FIG. 2.

The part 14 with the concavity directed upward has a substantially U-shaped transverse cross-section, as is clearly visible in the sectional view of FIG. 5.

The rear wider part 18 has two lateral portions 20 and 21 that extend outward and upward from the central portion 22 so as to form corresponding resting regions for a corresponding padding portion 23.

The region 24 of the covering 13 of the portion 16 of padding 12 of the part 14 with the concavity directed upward is closed and fixed at the upper edge 25 of the concavity 15, so that the outer surface of the part 14 with the concavity directed upward is visible.

A shell 11 as described above can be manufactured for example by molding plastic material.

As in saddles of the known type, the shell 11 also has an upper pocket 28 and two rear holes 29 and 30 for the fixing of three corresponding ends of a supporting frame, which is not shown for the sake of simplicity and is to be understood as being of a type known per se.

In practice it has been found that the invention achieves the intended aim and objects.

In particular, the invention provides a saddle that is more comfortable than similar saddles of the known type thanks to the fact that the shell is shaped so that the upper part has a concavity facing upward and so that the rear wider part is provided with the lateral portions described above that extend outward and upward, so as to be able to support a thicker padding than known types of saddles, in which the front pointed part and the rear wider part are concave with the concavity directed downward.

Moreover, the invention provides a saddle that provides an aesthetic impact that is new and distinctive with respect to known saddles, thanks to the shell which, at least in its front pointed part, remains visible even after the assembly of the padding and covering.

The saddle according to the invention can be installed on existing bicycles like known saddles.

Last but not least, the invention provides a bicycle saddle that can be manufactured with known systems and technologies.

The invention thus conceived is susceptible of numerous modifications and variations, all of which are within the scope of the appended claims; all the details may further be replaced with other technically equivalent elements.

In practice, the materials used, as long as they are compatible with the specific use, as well as the contingent shapes and dimensions, may be any according to the requirements and the state of the art.

The disclosures in Italian Patent Application No. PD2012A000044 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A bicycle saddle comprising a shell, a padding and an overlying covering for said padding, wherein said shell has an upwardly facing surface that has at least one part thereof which is formed with a concavity directed upward in the configuration for use, so as to accommodate a corresponding portion of padding;

wherein said part with a concavity directed upward extends from an end of a front tip of the saddle substantially to the beginning of a rear part for resting a user, wherein said part with a concavity directed upward extends entirely between lateral edges of said saddle;

wherein said rear part has two lateral portions, which extend outward and upward from a central portion so as to form corresponding resting regions for a corresponding portion of padding.

2. The saddle according to claim 1, wherein said at least one part with a concavity directed upward has a substantially U-shaped transverse cross-section.

3. The saddle according to claim 1, wherein a region of the covering of the portion of the padding of the part with a concavity directed upward is closed and fixed to the shell at an upper edge of the concavity.

4. The saddle according to claim 1, wherein the overlying covering is on the padding and on the shell.

* * * * *